United States Patent
Jo et al.

(10) Patent No.: US 12,276,411 B2
(45) Date of Patent: Apr. 15, 2025

(54) TV AND CONTROL METHOD THEREOF

(71) Applicant: LG ELECTRONICS INC., Seoul (KR)

(72) Inventors: Minyoung Jo, Seoul (KR); Seungil Lee, Seoul (KR); Jinwan Bae, Seoul (KR); Jinyung Park, Seoul (KR); Jiyoun Cha, Seoul (KR); Jungbin Lee, Seoul (KR); Younkyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/719,141

(22) PCT Filed: Oct. 19, 2022

(86) PCT No.: PCT/KR2022/015934
§ 371 (c)(1),
(2) Date: Jun. 12, 2024

(87) PCT Pub. No.: WO2023/113190
PCT Pub. Date: Jun. 22, 2023

(65) Prior Publication Data
US 2025/0052409 A1    Feb. 13, 2025

(30) Foreign Application Priority Data
Dec. 13, 2021    (KR) .......................... 10-2021-0177440

(51) Int. Cl.
*F21V 23/04*    (2006.01)
*F21V 33/00*    (2006.01)
*F21Y 115/10*    (2016.01)

(52) U.S. Cl.
CPC ...... *F21V 23/0471* (2013.01); *F21V 33/0052* (2013.01); *F21Y 2115/10* (2016.08)

(58) Field of Classification Search
CPC ............. F21V 23/0471; F21V 33/0052; F21V 23/0442; F21V 23/04; F21V 23/00; F21V 33/00; F21Y 2115/10
See application file for complete search history.

(56) References Cited

U.S. PATENT DOCUMENTS

2011/0285926 A1* 11/2011 Yokote .................. G06F 1/1637
                                                                    348/841
2022/0191996 A1* 6/2022 Huang ................... H05B 47/18

FOREIGN PATENT DOCUMENTS

| JP | 2013-120748 A | 6/2013 |
| KR | 10-0912425 B1 | 8/2009 |
| KR | 10-2011-0061729 A | 6/2011 |
| KR | 10-2015-0094438 A | 8/2015 |
| KR | 10-2021-0061311 A | 5/2021 |

* cited by examiner

*Primary Examiner* — Bao Q Truong
(74) *Attorney, Agent, or Firm* — Birch, Stewart, Kolasch & Birch, LLP (57) ABSTRACT

A TV according to an embodiment of the present disclosure comprises: a screen which displays a content; a cover at least a part of which overlaps the screen and to which one or more illuminators are attached; a sensor which senses an object located behind the screen; and a controller which controls the one or more illuminators according to the sensing result of the sensor.

14 Claims, 9 Drawing Sheets

TV AND CONTROL METHOD THEREOF

CROSS REFERENCE TO RELATED APPLICATIONS

This application is the National Phase of PCT International Application No. PCT/KR2022/015934, filed on Oct. 19, 2022, which claims priority under 35 U.S.C. 119 (a) to Patent Application No. 10-2021-0177440 filed in Republic of Korea on Dec. 13, 2021, all of which are hereby expressly incorporated by reference into the present application.

TECHNICAL FIELD

The present disclosure relates to a variety of multimedia devices equipped with displays, etc., and can be applied to, for example, televisions (TVs) equipped with LED lights.

BACKGROUND ART

Televisions (TVs) according to the related art are unable to provide special services related to a back surface or backward direction of screens thereof. In most cases, TVs located in homes are wall-mounted and attached closely to the wall, or are installed in close contact with the wall without directly touching the wall. Therefore, there is no research on how the back surface, etc. of the TV can be used technically. However, the needs of users who require new form factors that are completely different from conventional TVs are gradually increasing.

DISCLOSURE

Technical Problem

An object of the present disclosure is to provide a new form factor that allows the back surface of a TV screen to be used for other purposes.

Another object of the present disclosure is to provide a method for arranging various types of LED lights, etc. on a cover formed to surround the TV screen.

Another object of the present disclosure is to provide a solution for adaptively adjusting the LED lighting according to the type/size/distance/size of an object located behind the TV screen.

Technical Solutions

In accordance with an aspect of the present disclosure, a television (TV) may include: a screen configured to display a content: a cover configured to at least partially overlap the screen and including at least one lighting attached thereto; a sensor configured to detect an object located behind the screen; and a controller configured to control the at least one lighting according to a sensing result of the sensor The at least one lighting may include all of a first type of lighting, a second type of lighting, and a third type of lighting.

The first type of lighting may include LED lightings installed at an uppermost end and left/right surfaces of the cover: the second type of lighting may include pin lighting installed at the uppermost end of the cover; and the third type of lighting may be an LED lighting installed at a lowermost end of the cover.

When the sensing result of the sensor indicates that a distance between the object and the screen is within a predetermined distance, the controller may reduce an intensity of the first type of lighting to a predetermined level or less.

When the sensing result of the sensor indicates that a distance between the object and the screen is equal to or greater than a predetermined distance, the controller may increase the intensity of the first type of lighting to a predetermined level or higher.

When the sensing result of the sensor indicates that recognition of the object fails, the controller may turn off the first type of lighting and may turn on the third type of lighting.

The controller may analyze color information of the content displayed on the screen, and may change LED colors displayed through the first type of lighting, the second type of lighting, and the third type of lighting.

In accordance with another aspect of the present disclosure, a method for controlling a television (TV) may include: displaying content through a screen; detecting, by a sensor, an object located behind the screen; and controlling at least one lighting according to a sensing result of the sensor.

Advantageous Effects

As is apparent from the above description, the TV and a method for controlling the same according to the embodiment of the present disclosure may provide a new form factor that allows the back surface of the TV to be used for other purposes.

The TV and the method for controlling the same according to another embodiment of the present disclosure may provide a method for arranging various types of LED lighting, etc. on a cover formed to surround the TV screen. Additionally, the TV and the method for controlling the same according to another embodiment of the present disclosure can improve the user's convenience by partially controlling the LED lighting according to video data displayed on the TV screen.

The TV and the method for controlling the same according to still another embodiment of the present disclosure can provide a solution for adaptively adjusting the LED lighting according to the type/size/distance/size of an object located behind the TV screen.

However, in addition to the technical effects explicitly mentioned above, those skilled in the art can also implement other effects through the components throughout the specification and drawings.

BEST MODE

Figure 1:
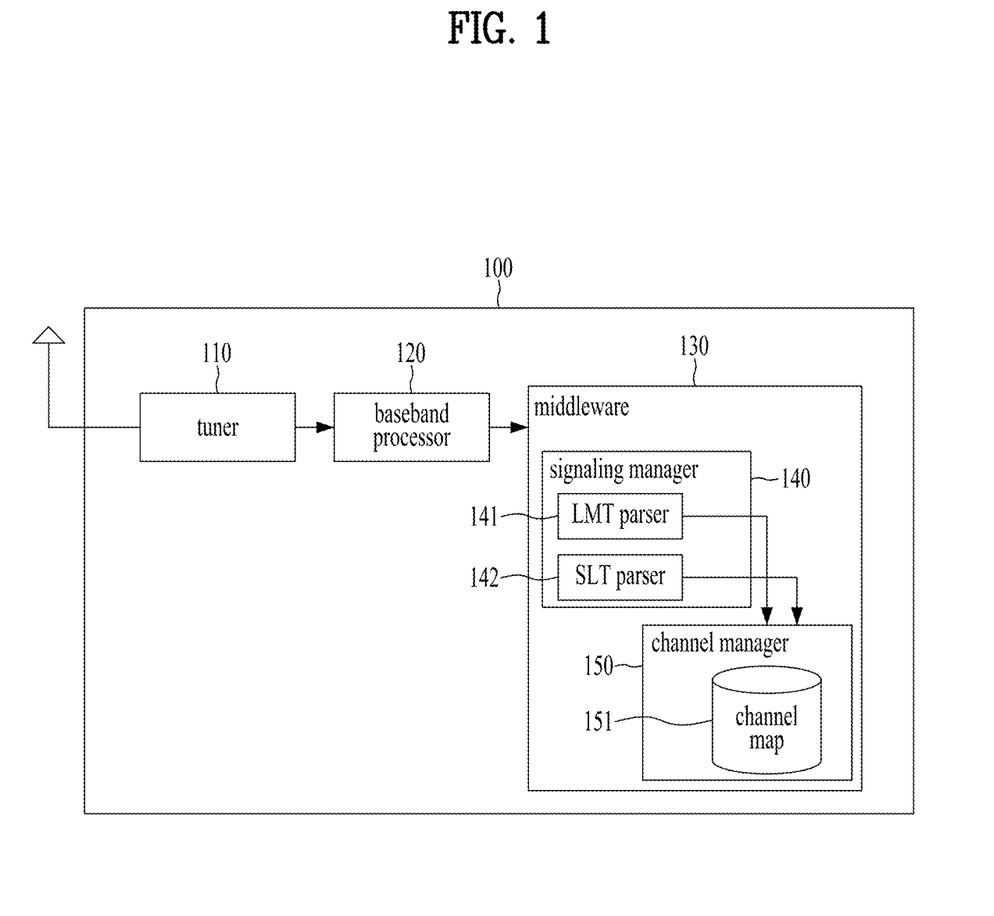
FIG. 1 illustrates internal components of a TV according to an embodiment of the disclosure.

FIG. 1 illustrates internal components of a TV according to an embodiment of the disclosure.

The disclosure is applicable to a variety of TV products, for example, the European standard, Digital Video Broadcasting (DVB) or the North American/Korean standard, Advanced Television Systems Comminute (ATSC) 3.0.

However, although an exemplary process of performing an initial service scan operation by a TV 100 in conformance to the ATSC 3.0 standard is described with reference to FIG. 1, the scope of the disclosure should be determined in accordance with the appended claims.

A tuner 110 determines whether a signal is present, using a predetermined list of frequencies. Upon detection of a signal at a given frequency, a baseband processor 120 extracts L1 signaling of a preamble.

Further, the baseband processor 120 may transmit physical layer pipe (PLP) data including link layer signaling and low level signaling (LLS) to middleware 130, and the middleware 130 may extract the link layer signaling and the LLS from the PLP data.

The middleware 130 includes a signaling manager 140 and a channel manager 150.

After receiving the PLP data including the link layer signaling and the LLS from the baseband processor 120, the middleware 130 passes the data to an appropriate parser.

For example, the middleware 130 extracts a link mapping table (LMT) from the link layer signaling and passes the LMT to an LMT parser 141. Further, the middleware 130 extracts a service list table (SLT) from the LLS and passes the SLT to an SLT parser 142.

The LMT parser 141 parses the LMT and extracts first information (e.g., a PLPID, session information (an IP address and a port number), and so on) required to generate a channel map.

The SLT parser 142 parses the SLT and extracts second information (e.g., a service id, a service name, and so on) required to generate the channel map.

The extracted first and second information are stored in a channel map 151.

Figure 2:
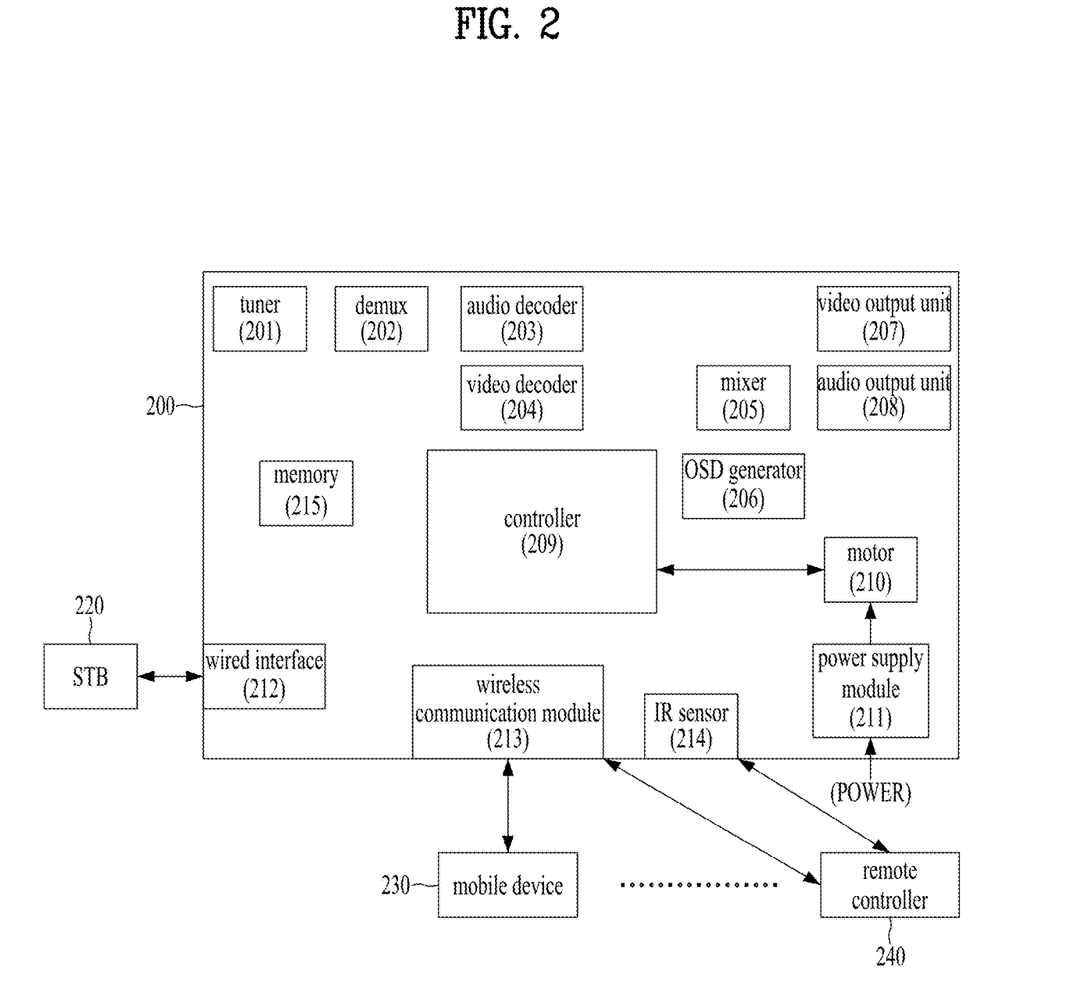
FIG. 2 illustrates external devices and internal components of a TV according to another embodiment of the disclosure.

FIG. 2 illustrates external devices and internal components of a TV according to another embodiment of the disclosure. It is also possible for those skilled in the art may combine some components to implement the disclosure, referring to FIGS. 2 and 3. For example, the baseband processor 120 and the Middleware 130 illustrated in FIG. 1 may be included in a controller 209 illustrated in FIG. 2.

While a TV 200 illustrated in FIG. 2 includes various components, the scope of the disclosure is not limited thereto and should be defined in accordance with the appended claims.

Further, the internal components of the TV 200 illustrated in FIG. 2 may be controlled through the controller 209 and directly or indirectly connected to each other. That is, although not shown in FIG. 2, all of the internal components of the TV 200 illustrated in FIG. 2 are designed to be able to directly or indirectly transmit and receive control signals and/or data.

First, a tuner 201 receives a broadcast signal through an antenna or the like, and a demux or demultiplexer 202 demultiplexes the broadcast signal into audio data and video data.

An audio decoder 203 decodes the audio data (which has been encoded) included in the broadcast signal, and a video decoder 204 decodes the video data (which has been encoded) included in the broadcast signal.

The decoded audio data is output through an audio output unit 207. The audio output unit 207 may be, for example, a speaker attached to or spaced apart from the TV 200.

The decoded video data is output directly through a video output unit 208. Alternatively, a mixer 205 mixes menu data generated by an OSD generator 206 with the video data and transmits the mixed data to the video output unit 208.

A memory 215 stores various control data and commands for controlling the TV 200, and the controller 209 may control all of the components in the TV by referring to the memory 215.

Further, the TV 200 transmits and receives data to and from various external devices in its vicinity by communicating with them. For example, the TV 200 receives video/audio data from an STB 220 via a wired interface 212, and the video/audio data is processed by the audio decoder 203 and the video decoder 204, respectively. Alternatively, the received video/audio data may be output directly through the audio output unit 207 and the video output unit 208 bypassing the decoders 203 and 204.

The TV 200 transmits and receives various data to and from a mobile device 230 (e.g., a portable phone/wearable device or the like) via a wireless communication module 213, and receives an IR signal from a remote control 240 through an IR sensor 214. Alternatively, the remote control 240 capable of Bluetooth communication such as BT transmits and receives various data to and from the TV via the wireless communication module 213.

Unlike a conventional TV, the TV 200 according to an embodiment of the disclosure further includes a motor 210 inside or outside the TV 200. Therefore, it is possible to freely control the area of an exposed screen of the TV 200 by using the motor 210 (more specific embodiments in this regard will be described in more detail below with reference to FIGS. 3 to 6). In contrast, the conventional TV suffers from the problem that a full screen of the same size is always exposed.

Of course, the embodiment of the present disclosure can be applied to other cases in which the TV does not include the motor 210, etc. and the exposed screen is fixed to the TV. More specific embodiments will be described in more detail later with reference to drawings below FIG. 3. In addition, FIGS. 1 and 2 are merely examples, and the scope of rights of the present disclosure should be interpreted according to the matters set forth in the patent claims.

Figure 3:
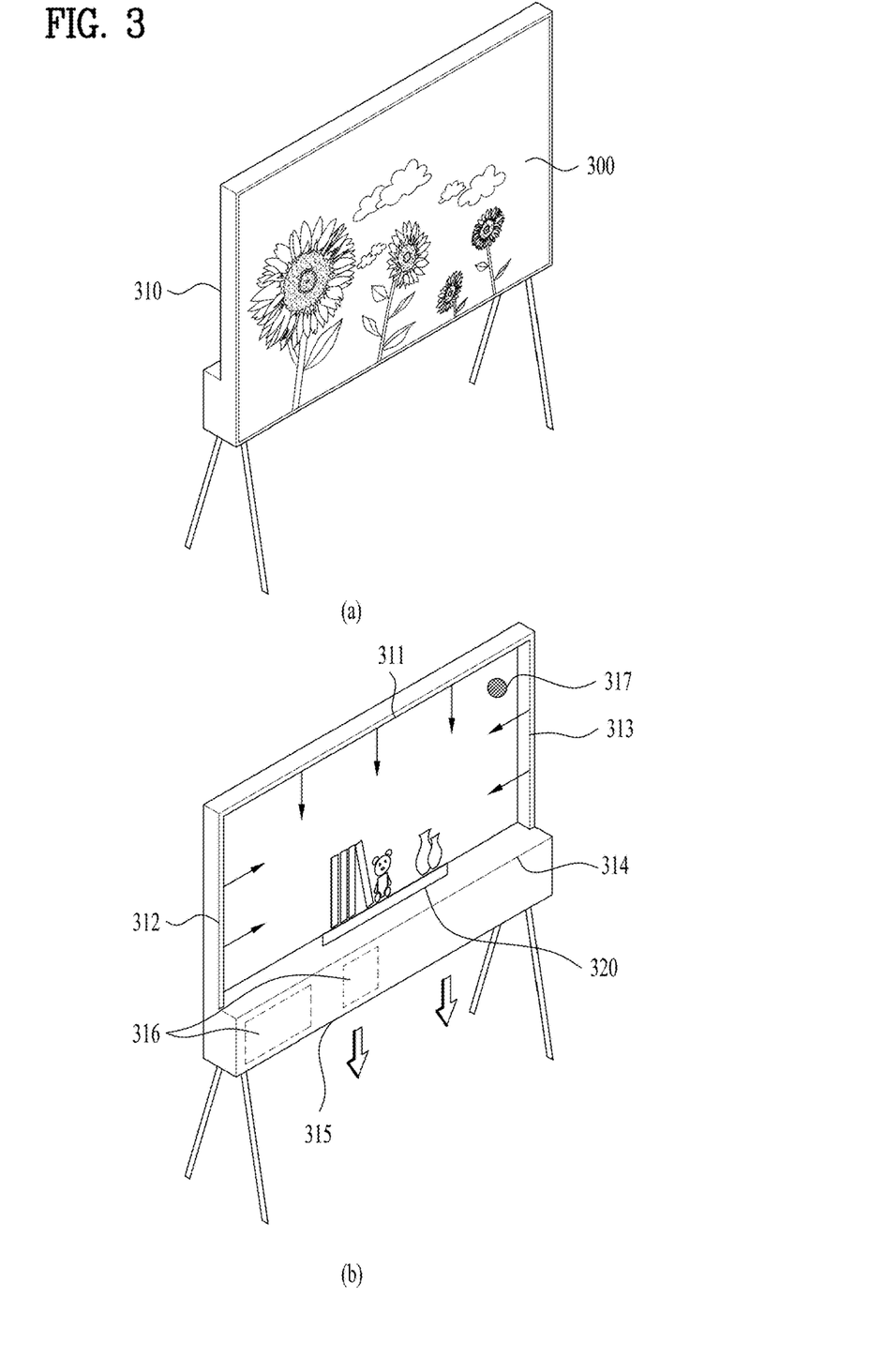
FIG. 3 is a schematic diagram illustrating appearances of a front surface and a back surface of a TV according to an embodiment of the present disclosure.

FIG. 3 is a schematic diagram illustrating the front and back appearances of the TV according to an embodiment of the present disclosure.

FIG. 3(*a*) is a front perspective view of the TV viewed from the front according to the embodiment of the present disclosure. Unlike the conventional TV, the TV according to the embodiment of the present disclosure not only has a screen 300 located on the front surface, but also has a cover 310 surrounding the screen 300.

Referring to FIG. 3(a), the cover 310 may overlap at least a portion of the screen 300, and one or more lights are attached thereto. The cover 310 will be described in more detail with reference to FIG. 3(b).

FIG. 3(b) is a rear perspective view of the TV according to an embodiment of the present disclosure.

As can be seen from FIG. 3(b), unlike the conventional TV, the TV according to the embodiment of the present disclosure additionally includes various structures located on the back surface thereof.

The cover surrounding the back surface of the TV screen may be provided with a first type of lighting, a second type of lighting, and a third type of lighting.

First, the first type of lighting may include, for example, the LED lighting installed on a top surface 311, a left side surface 312, and a right side surface 313 of the cover.

Meanwhile, the second type of lighting may include, for example, a pin lighting installed at the top surface 311 of the cover. Here, the pin lighting may be used to intensively illuminate a specific object, and may also be referred to as spot lighting. In particular, in relation to the present disclosure, the pin lighting installed at the top surface 311 of the cover may be installed at a position corresponding to at least one object 320 placed in an intermediate region 314 of the cover.

Although FIG. 3 illustrates that the first type of lighting and the second type of lighting are placed inside the cover, the scope or spirit of the present disclosure is not limited thereto, and it should be noted that the first type of lighting and the second type of lighting are also placed outside the cover to emit much more light.

In addition, the third type of lighting is designed to include, for example, the LED lighting installed at the lowermost end (bottom) 315 of the cover.

Furthermore, the lightings installed at various positions (311, 312, 313, 315) of the cover can adjust the intensity of light or can change the direction of light, which will be described in more detail later with reference to FIGS. 8 and 9.

Meanwhile, as shown in FIG. 3(b), the back surface of the TV according to an embodiment of the present disclosure may function not only as a storage structure but also as the LED lighting.

For example, in order for the intermediate region 314 of the cover to operate as a shelf structure, the intermediate region 314 of the cover is located perpendicular (or located at a right angle of 90 degrees) to the back surface of the screen. Therefore, for example, a vase, a figure, a book, etc. can be placed in the intermediate region 314.

In addition, the specific region 316 of the cover may be implemented in the form of a drawer to accommodate, for example, a set-top box (STB), a TV box, a console, a multi-tap, etc.

When the TV is designed as shown in FIG. 3(b), various services using the back lighting installed at the back surface of the TV are possible no matter where the TV is placed in the house. Also, even if the TV is not installed near the wall, cable lines, etc. are not visible.

Meanwhile, the sensor 317 shown in FIG. 3(b) may be added to detect the presence or absence of an object on the back surface of the TV, the size of the object, or the distance between the TV and the object.

The sensor 317 may be a vision-based sensor or may be a TOA(time of arrival) type sensor that calculates a round trip time (RTT) in which signals or the like are first transmitted and then returned to the sensor.

More specifically, examples of the sensor 317 may include an ultrasonic sensor using sound waves, an infrared (IR) sensor using infrared, a Lidar sensor using laser light, a radar sensor using radio frequency (RF) waves, a camera sensor using visible light, and the like.

In particular, an embodiment in which the TV is provided with the lighting operable by the sensor 317 installed at the back surface of the TV screen, will be described in more detail later with reference to FIG. 7.

In addition, even when the TV screen is turned off, the LED lighting located at the back surface of the TV screen can be controlled and used as a mood lighting. As the mood lighting, for example, a third type of lighting installed at the bottom 315 of the cover can be used.

In addition, the first type of lighting installed at the top 311, the left side 312, and the right side 313 of the cover can also be designed to operate in synchronization with the content displayed on the TV screen. This will be explained later with reference to FIG. 4.

Figure 4:
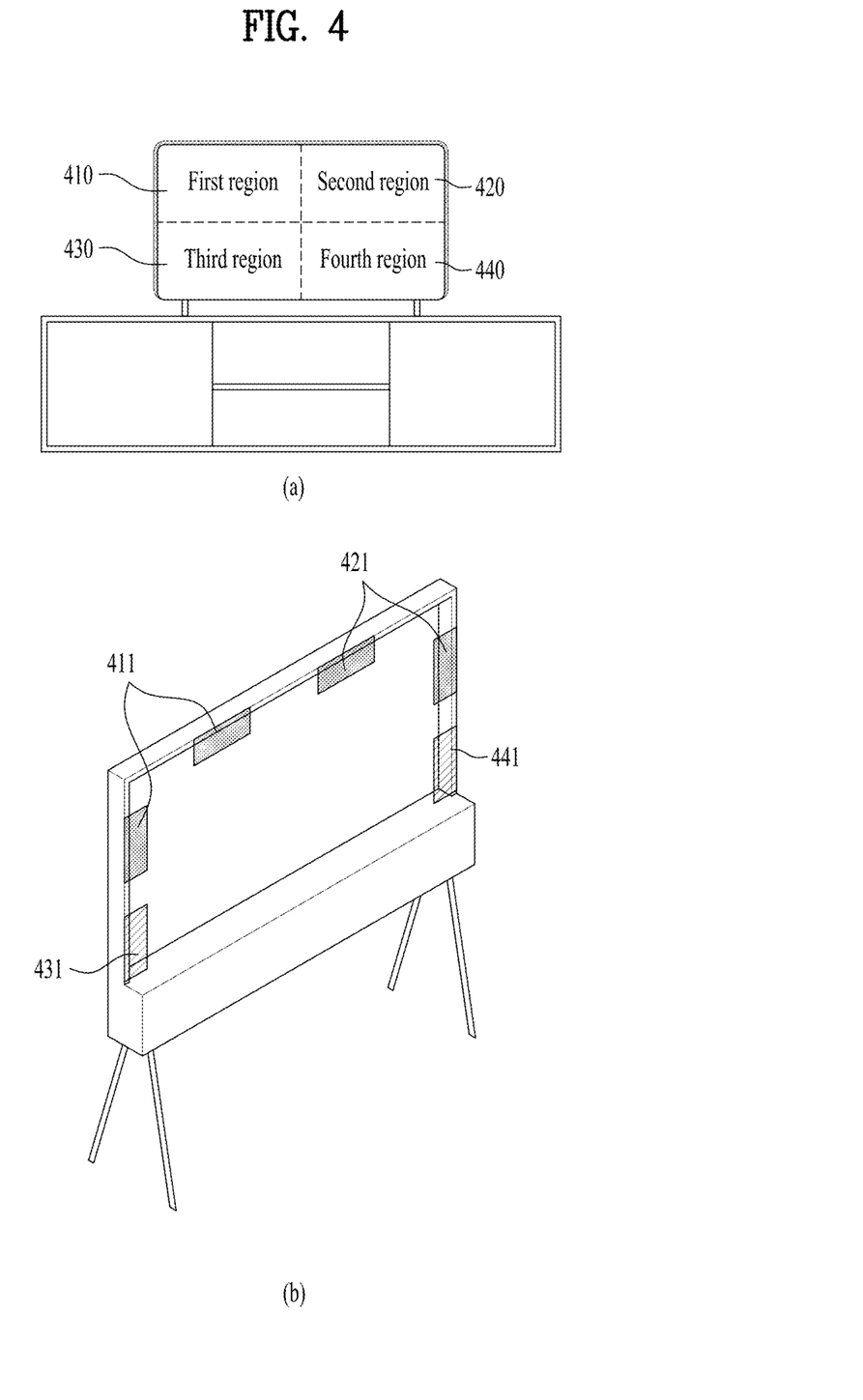
FIG. 4 is a conceptual diagram illustrating a process in which the TV individually controls LED lightings located at a back surface thereof according to video data displayed on a screen according to an embodiment of the present disclosure.

FIG. 4 is a conceptual diagram illustrating a process in which the TV individually controls the LED lightings located at a back surface thereof according to video data, displayed on a screen according to an embodiment of the present disclosure.

Referring to FIG. 4(a), the TV according to one embodiment of the present disclosure may divide the screen into four regions (410, 420, 430, 440). Of course, the four regions are merely examples, and dividing the screen into different numbers of regions according to the needs of those skilled in the art can also fall within the scope of other rights of the present disclosure.

Furthermore, the TV according to an embodiment of the present disclosure may obtains a color histogram for each of the divided regions (410, 420, 430, 440), and may determine a maximum value from among the obtained color histogram as a representative color (hue) value for each region. Of course, as examples of other methods, a method for determining an average value of the color histogram as a representative color value of the corresponding region, and a method for determining a main color (hue) vector as a representative color (hue) value of the corresponding region can also be applied to the present disclosure.

In addition, it is assumed that, based on the above-described method, etc., a representative color value of the first region 410, a representative color value of the second region 420, a representative color value of the third region 430, and a representative color value of the fourth region 440 are detected.

Finally, as shown in FIG. 4(b), the TV according to an embodiment of the present disclosure nay have advantages in that lighting effects similar to those of the image displayed on the TV screen can be seen by adjusting the LED lighting located at the rear cover.

More specifically, for example, a first group of LED lightings 411 may output light of the same color as the representative color value of the second region 420 shown in FIG. 4(a), and a second group of LED lighting 421 may output light of the same color as the representative color value of the first region 410 shown in FIG. 4(a).

Furthermore, a third group of LED lightings 431 may output light of the same color as the representative color value of the fourth region 440 shown in FIG. 4(a), and the fourth group of LED lightings 441 may outputs light of the same color as the representative color value of the third region 430 shown in FIG. 4(a).

In some cases, when there is little color change in video data displayed on the TV screen or when the same video data is output for a certain period of time (for example, less than 3 seconds), the LED lighting that is located at the back cover and is restrictively designed to operate as shown in FIG. 4 is also within the scope of other rights of the present disclosure.

That is, the TV according to the embodiment of FIG. 4 can analyze the color information of the content displayed on the screen, and can change the LED colors displayed through the first type of lighting, the second type of lighting, and the third type of lighting.

On the other hand, a process in which the TV operates in time series according to an embodiment of the present disclosure will be described later with reference to FIG. 5.

Figure 5:
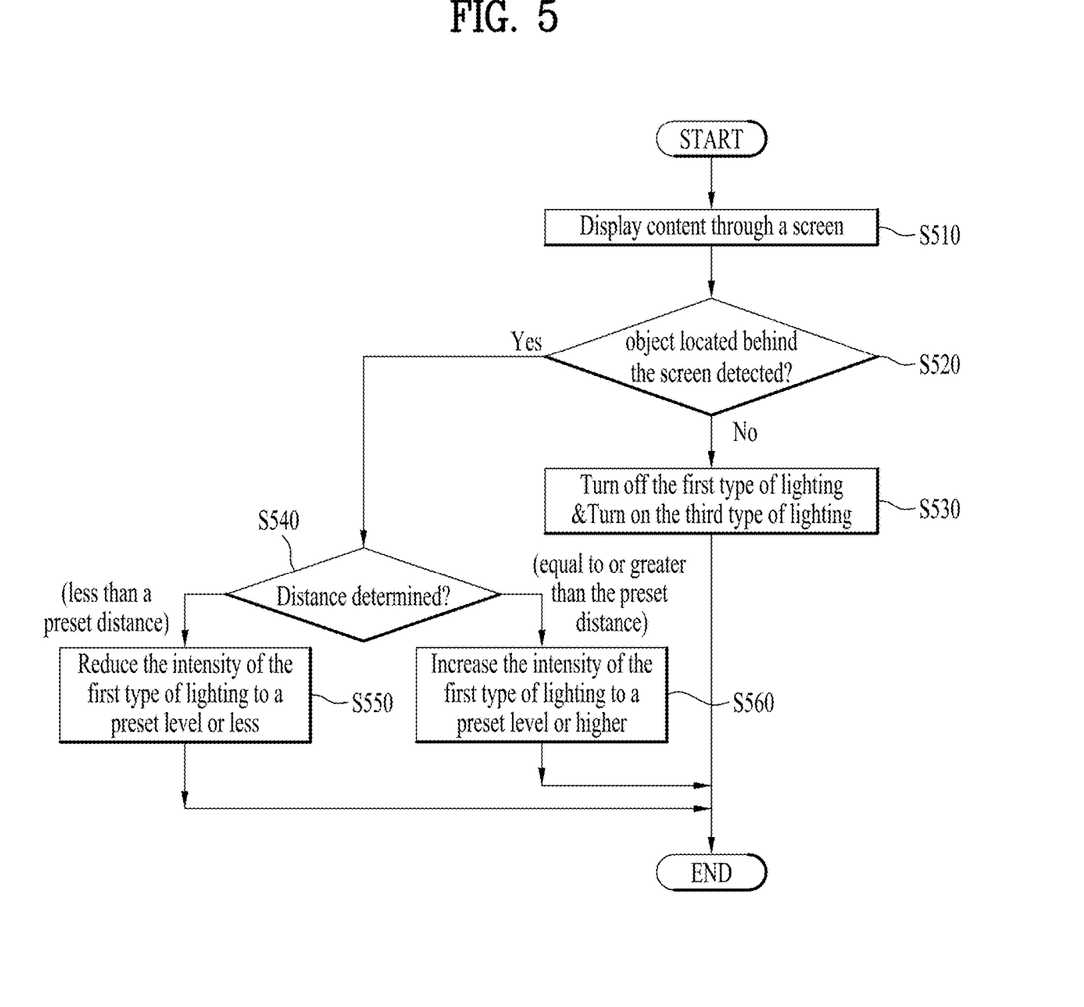
FIG. 5 is a flowchart sequentially illustrating a method for controlling the TV according to an embodiment of the present disclosure.

FIG. 5 is a flowchart sequentially illustrating a method for controlling the TV according to an embodiment of the present disclosure.

Referring to FIG. 5, the TV according to an embodiment of the present disclosure is designed to display content through a screen thereof (S510).

Furthermore, the TV may determine whether an arbitrary object is located behind the screen through the sensor (S520). A sensor installed at the back surface of the TV according to an embodiment of the present disclosure has already been described with reference to FIG. 3(*b*), as such redundant description thereof will herein be omitted for brevity.

According to the determination result of S520 (according to the sensing result of the sensor), one or more lightings added to the back cover of the screen of the TV may be controlled.

In the present embodiment, one or more lightings may include, for example, at least one of the first type of lighting, the second type of lighting, and the third type of lighting.

The first type of lighting may include, for example, the LED lightings installed at the top and the left/right sides of the cover, the second type of lighting may include, for example, pin lighting installed at the top of the cover, and the third type of lighting may include, for example, pin lighting installed at the top of the cover. Although the above-described first, second, and third types of lightings have already been described with reference to FIG. 3(*b*), the scope or spirit of the present disclosure is not limited thereto, and the above-described three types of lightings will be described in detail later with reference to FIG. 6.

When it is recognized that there is no arbitrary object located behind the TV according to the determination result of S520 (the sensing result of the sensor), the first type of lighting is turned off and the third type of lighting is turned on (S530).

On the other hand, when the arbitrary object located behind the TV is recognized according to the determination result of S520, the distance between the recognized object and the TV (screen) is secondarily determined (S540).

As the secondary determination result of S540, when the distance between the object and the screen is within a preset distance, the TV according to an embodiment of the present disclosure may reduce the intensity of the first type of lighting to a preset level or less (S550).

On the other hand, as the secondary determination result (S540), when the distance between the object and the screen is greater than or equal to a preset distance, the TV according to an embodiment of the present disclosure may increase the intensity of the first type of lighting to a preset level or higher (S560).

A solution for controlling various types of LED lightings differently depending on the presence or absence of an object recognized at the rear of the TV and the distance between the TV and the object will be described in more detail with reference to FIG. 7.

Figure 6:
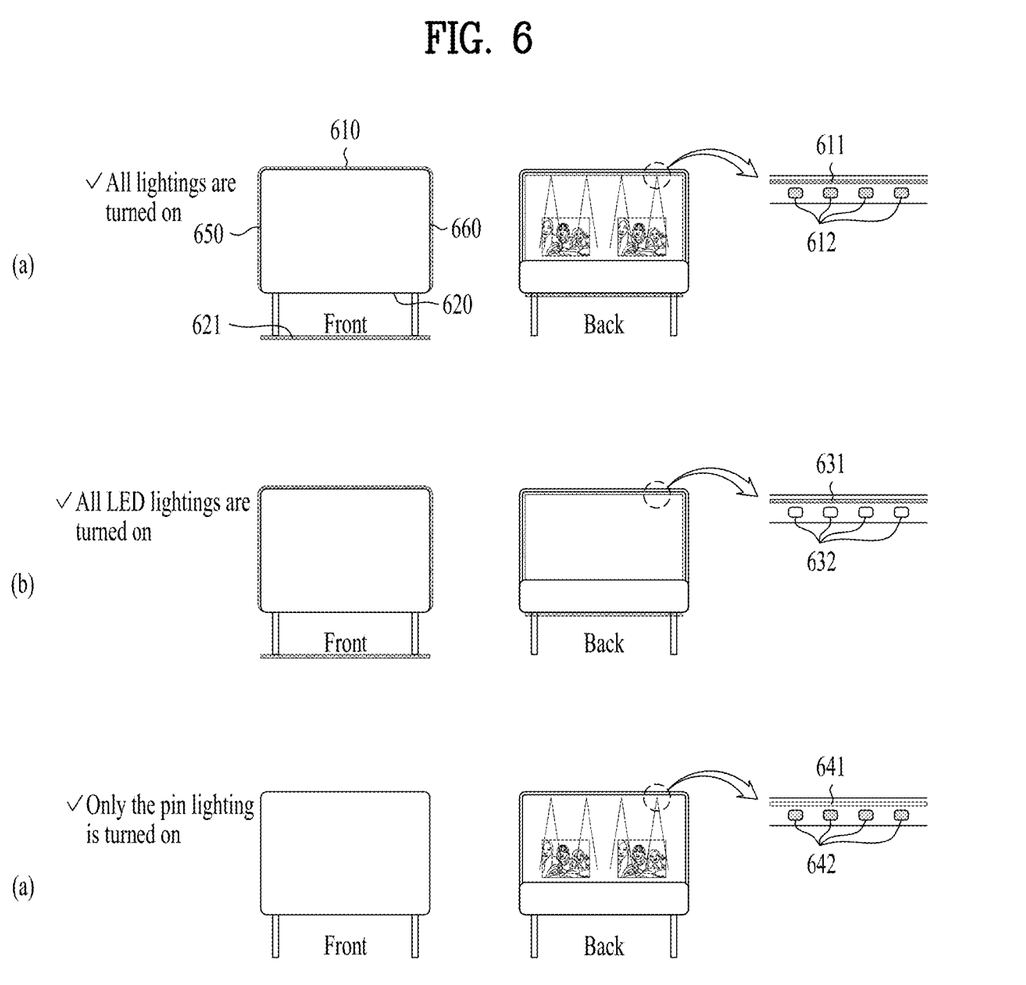
FIG. 6 shows three different types of lightings added to a TV according to an embodiment of the present disclosure.

FIG. 6 shows three different types of lightings added to the TV according to an embodiment of the present disclosure.

FIG. 6(*a*) shows an example case where the first type of lighting, the second type of lighting, and the third type of lighting are turned on.

Referring to FIG. 6(*a*), when viewed from the front, the LED lightings respectively installed at the top 610, the left side 650, and the right side 660 of the cover surrounding the TV screen may correspond to the first type of lighting. The pin lighting installed at the top 311 of the cover may correspond to the second type of lighting. In addition, the LED lighting installed at the bottom 620 of the cover may correspond to the third type of lighting, and when the third type of lighting is turned on, light 621 is reflected on the floor.

Meanwhile, the first type of lighting and the second type of lighting are mixed at the top of the cover. When the first type of lighting and the second type of lighting are enlarged as shown in FIG. 6, the first type of lighting 611 may correspond to one connected LED, and the second type of lighting 612 may correspond to a group of discontinuous pin lightings. Therefore, it is possible to reflect light in units of individual objects located at the cover shelf. In FIG. 6(*a*), it is assumed that both the first type of lighting 611 and the second type of lighting 612 are turned on.

FIG. 6(*b*) shows an example case where the pin lighting is turned off and only the LED lighting is turned on. That is, as shown in the rightmost enlarged view of FIG. 6(*b*), only the first type of LED lighting 631 is turned on, and the second type of pin lighting 632 is turned of.

Finally, FIG. 6(*c*) shows an example case where only the pin lighting is turned on and all LED lights are turned off That is, as shown in the rightmost enlarged view of FIG. 6(*c*), the first type of LED lighting 641 may be turned off, and the second type of pin lighting 642 may be turned on.

Accordingly, the user can individually turn on/off three different types of lightings such as the entire rear LED lighting, the rear upper pin lighting, and the rear lower LED lighting according to the user's needs.

However, according to one embodiment of the present disclosure, it is also possible to automatically control three types of lightings depending on whether the TV recognizes an object located at the rear side thereof, and the embodiment related thereto will be described below r with reference to FIG. 7.

Figure 7:
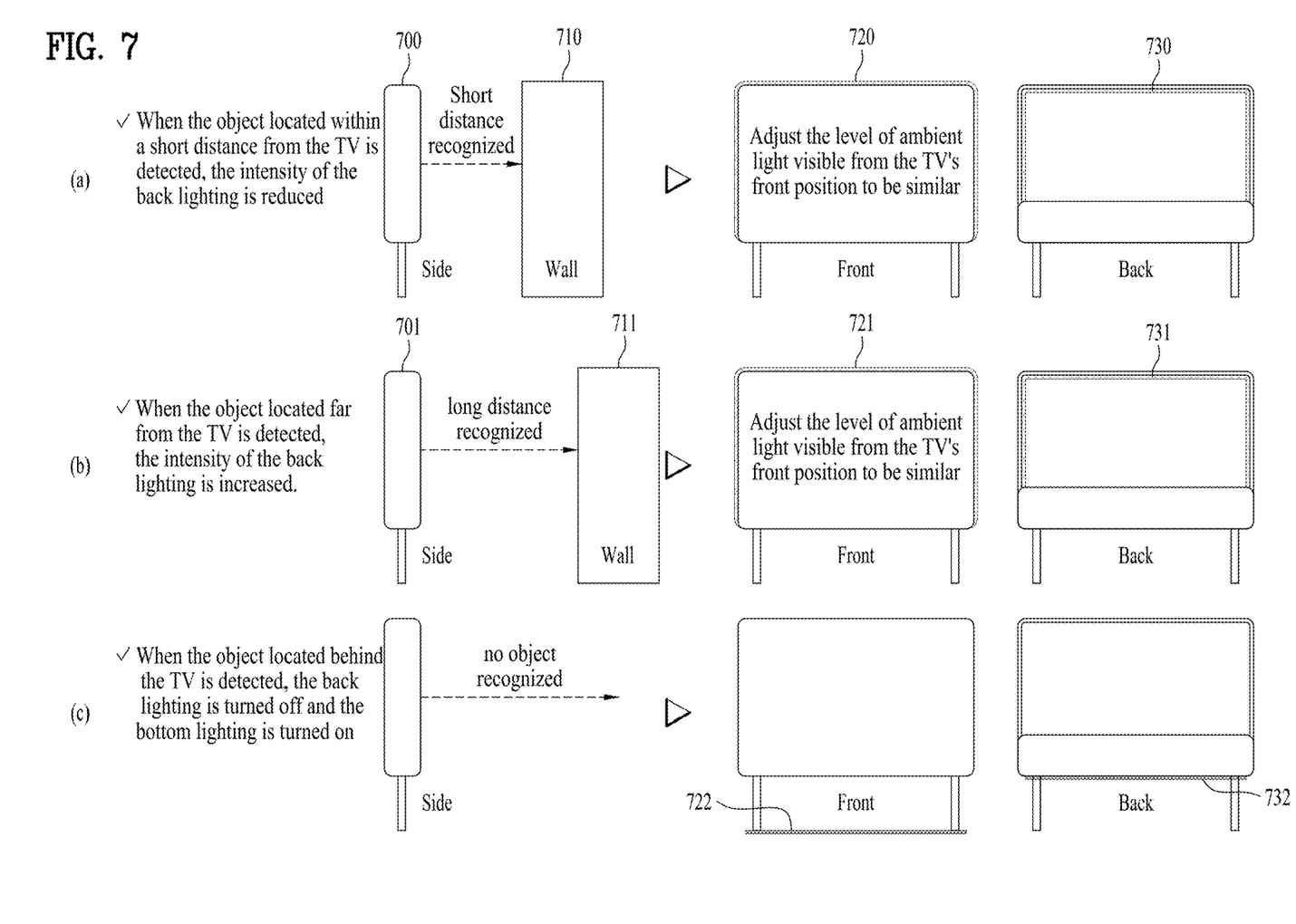
FIG. 7 shows a process in which the TV adaptively adjusts three different types of lightings according to an object located behind the TV according to an embodiment of the present disclosure.

FIG. 7 shows a process in which the TV adaptively adjusts three different types of lightings according to an object located behind the TV according to an embodiment of the present disclosure. In particular, there is a technical effect that the luminance (brightness) of the lightings is automatically adjusted according to the TV and the object located behind the TV, so that the same luminance level of lighting can always be provided to the user located in front of the TV.

First, as shown in FIG. 7(*a*), when the object 710 is located at a short distance (e.g, less than 100 cm) behind the TV 700, the intensity of the first type of lighting 730 is lowered. At this time, arbitrary light 720 can be confirmed by the user who views the TV when viewed from the front of the TV.

Meanwhile, as shown in FIG. 7(*b*), when the object 711 is located at a long distance (e.g., 100 cm or more) behind the TV 701, the intensity of the first type of lighting 731 is increased. At this time, from the user's perspective, there is an advantage in that the same intensity level of light 721 as those of FIG. 7(*a*) can be viewed by the user.

Finally, as shown in FIG. 7(*c*), when there are no objects located behind the TV, even if the first type of lighting is turned on, there will be almost no light displayed forward as it is reflected by the rear object or the like. Therefore, in this case, the third type of lighting 732 may be turned on and the lighting light may be displayed on the floor 722.

In order to implement the above embodiment, the lookup table shown in Table 1 below is designed to be stored in the memory of the TV according to an embodiment of the present disclosure.

TABLE 1

| | First type of Lighting | Third type of Lighting | Second type of Lighting |
|---|---|---|---|
| Distance between TV screen and rear object (less than 100 cm) | ON (LED luminance decreases) | OFF | Selective on/off control depending on the presence or absence of object(s) placed on the shelf |
| Distance between TV screen and rear object (100 cm or greater) | ON (LED luminance increases) | OFF | |
| Failure to detect objects behind the TV screen | OFF | ON | |

Meanwhile, although only the distance between the TV and the rear object is considered in FIG. 7, the scope or spirit of the present disclosure is not limited thereto, and other examples in which information up to the size information of the rear object is detected and the intensity of LED lightings is adjusted in consideration of the detected result can also fall within the scope of other rights of the present disclosure.

For example, even if an object is located at a shorter distance (for example, less than 100 cm) from the TV, when the recognized object is not a wall and only an object smaller in size than the TV is recognized, it is impossible to sufficiently reflect light of the LED lighting, so that the TV should be designed not to reduce a preset intensity level of the LED light source (unlike FIG. 7(*a*)).

Figure 8:
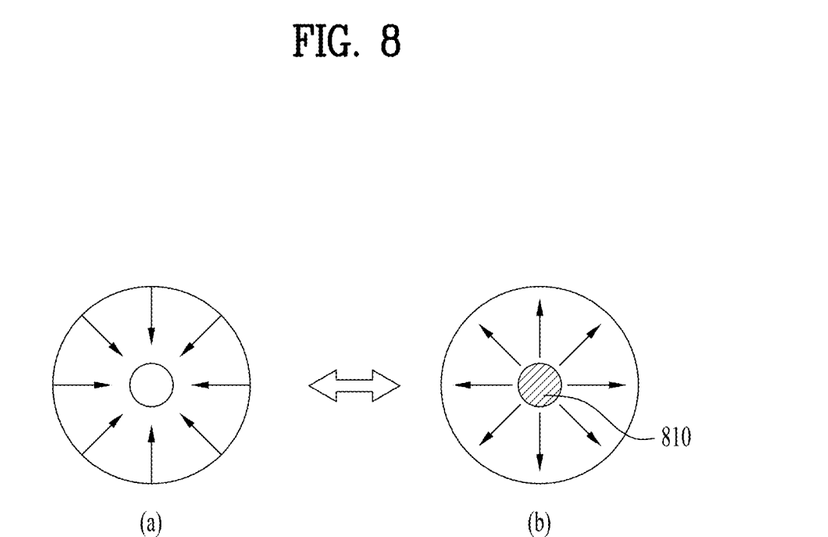
FIG. 8 is a top plan view illustrating the LED lightings added to the TV according to an embodiment of the present disclosure.

FIG. 8 is a top plan view illustrating the LED lightings added to the TV according to an embodiment of the present disclosure.

FIG. 8 is an enlarged view of the above LED lightings, and it is possible to adjust the intensity of LED light. For example, by adjusting the cover covering the LED sphere, the size of the light source can be adjusted.

FIG. 8(*a*) shows a state in which the cover completely covers the LED sphere, so that no light is emitted from the LED sphere of FIG. 8(*a*). On the other hand, the LED sphere shown in FIG. 8(*b*) is configured such that the cover is slightly open and light leaks out from an open region 810 of the LED sphere. Although not shown in FIG. 8, when the cover does not cover the LED sphere at all, most of the light from the LED sphere is emitted to the outside.

Figure 9:
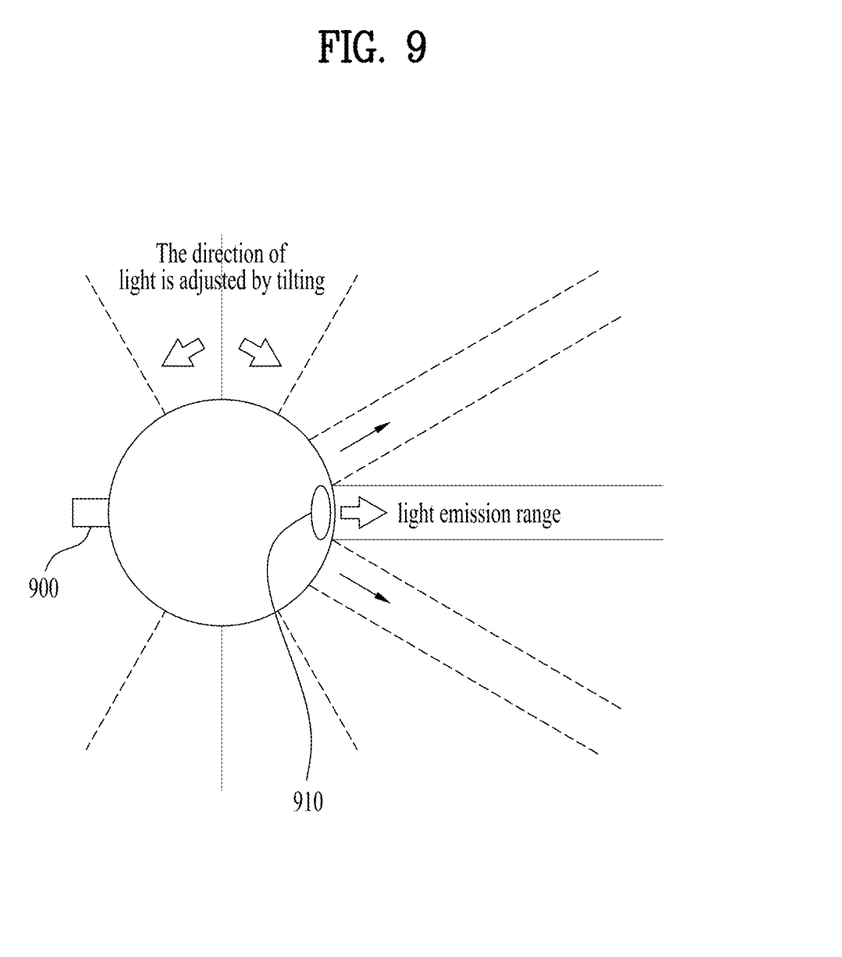
FIG. 9 is a side view illustrating the LED lighting added to the TV according to an embodiment of the present disclosure.

FIG. 9 is a side view illustrating the LED lighting added to the TV according to an embodiment of the present disclosure.

Whereas FIG. 8 shows an example in which light from the LED lighting is turned on or off or another example in which the amount of light is adjusted in the ON state of the LED lighting, FIG. 9 shows another example of controlling the direction in which light is emitted.

For example, through a tilting device 900 additionally attached to the LED sphere, it is possible to rotate the direction of light emitted through the cover 910 by 180 degrees in the vertical/horizontal direction(s).

In a situation where the above-described TV design is implemented, when playing music through the TV, it is possible to provide the LED lighting with movement and color that can synchronize with the beat. More specifically, for example, it is possible for the TV to create an atmosphere similar to a club or party, and it is also possible to adjust multiple LED spheres to create different light sources.

In addition, the directions of light emitted from multiple LED spheres are differently determined so that lighting art of a specific shape (such as letters or Olympic flag logo) can also be provided as an AOD (always on display) function when viewed from the rear side of the TV.

The present disclosure may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

[Best Mode for implementing the Invention]

Various embodiments of the disclosure have been described in the Best Mode.

INDUSTRIAL APPLICABILITY

The present disclosure is applicable to various types of multimedia device like TV, and thus has industrial applicability.

The invention claimed is:

1. A television (TV) comprising:
   a screen configured to display a content;
   a cover configured to at least partially overlap the screen and including at least one lighting attached thereto;
   a sensor configured to detect an object located behind the screen; and
   a controller configured to control the at least one lighting according to a sensing result of the sensor.

2. The television (TV) according to claim 1, wherein the at least one lighting includes:
   all of a first type of lighting, a second type of lighting, and a third type of lighting.

3. The television (TV) according to claim 2, wherein:
   the first type of lighting includes LED lightings installed at an uppermost end and left/right surfaces of the cover;
   the second type of lighting includes pin lighting installed at the uppermost end of the cover; and
   the third type of lighting is an LED lighting installed at a lowermost end of the cover.

4. The television (TV) according to claim 3, wherein:
   when the sensing result of the sensor indicates that a distance between the object and the screen is within a predetermined distance, the controller reduces an intensity of the first type of lighting to a predetermined level or less.

5. The television (TV) according to claim 4, wherein:
when the sensing result of the sensor indicates that a distance between the object and the screen is equal to or greater than a predetermined distance, the controller increases the intensity of the first type of lighting to a predetermined level or higher.

6. The television (TV) according to claim 5, wherein:
when the sensing result of the sensor indicates that recognition of the object fails, the controller turns off the first type of lighting and turns on the third type of lighting.

7. The television (TV) according to claim 6, wherein the controller is configured to:
analyze color information of the content displayed on the screen; and
change LED colors displayed through the first type of lighting, the second type of lighting, and the third type of lighting.

8. A method for controlling a television (TV) comprising:
displaying content through a screen;
detecting, by a sensor, an object located behind the screen; and
controlling at least one lighting according to a sensing result of the sensor.

9. The method according to claim 8, wherein the at least one lighting includes:
all of a first type of lighting, a second type of lighting, and a third type of lighting.

10. The method according to claim 9, wherein the first layer includes:
the first type of lighting includes LED lightings installed at an uppermost end and left/right surfaces of the cover;
the second type of lighting includes pin lighting installed at the uppermost end of the cover; and
the third type of lighting is an LED lighting installed at a lowermost end of the cover.

11. The method according to claim 10, further comprising:
when the sensing result of the sensor indicates that a distance between the object and the screen is within a predetermined distance, reducing an intensity of the first type of lighting to a predetermined level or less.

12. The method according to claim 11, further comprising:
when the sensing result of the sensor indicates that a distance between the object and the screen is equal to or greater than a predetermined distance, increasing an intensity of the first type of lighting to a predetermined level or higher.

13. The method according to claim 12, further comprising:
when the sensing result of the sensor indicates that recognition of the object fails, turning off the first type of lighting, and turning on the third type of lighting.

14. The method according to claim 13, further comprising:
analyzing color information of the content displayed on the screen; and
changing LED colors displayed through the first type of lighting, the second type of lighting, and the third type of lighting.

\* \* \* \* \*